Feb. 17, 1970              J. HAY              3,496,101
SEWAGE TREATMENT APPARATUS AND METHOD
Original Filed Oct. 20, 1965              3 Sheets-Sheet 1
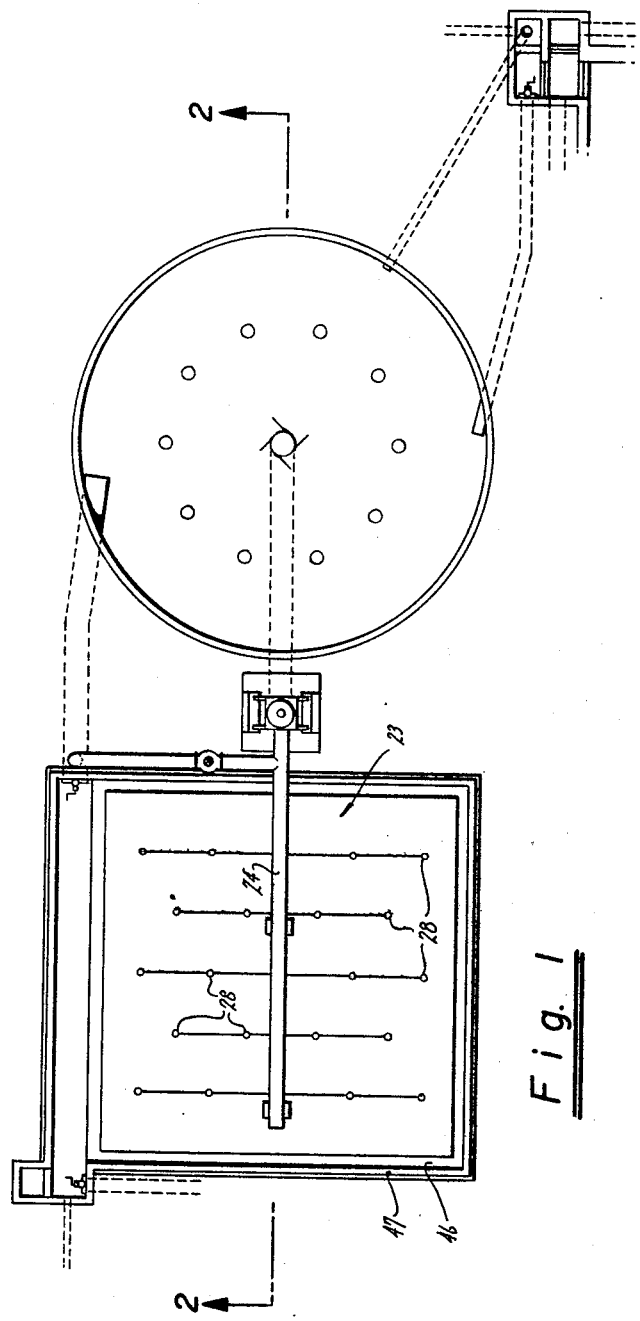
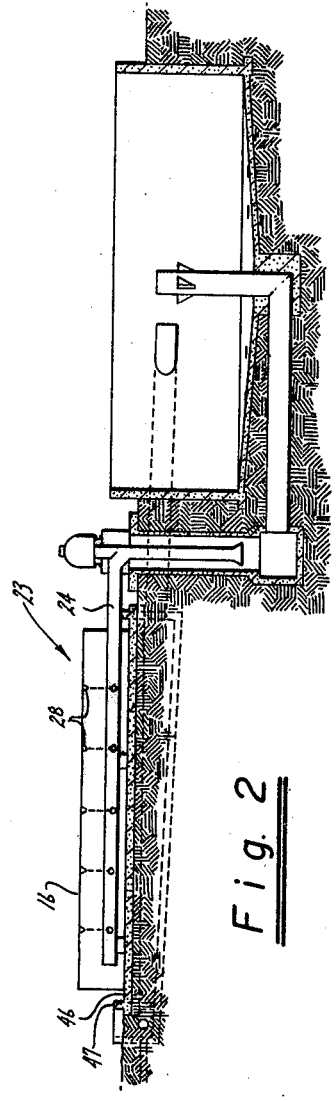
INVENTOR.
John Hay
BY Warren, Brosler, Cypher & Anglim His Attorneys INVENTOR.
John Hay

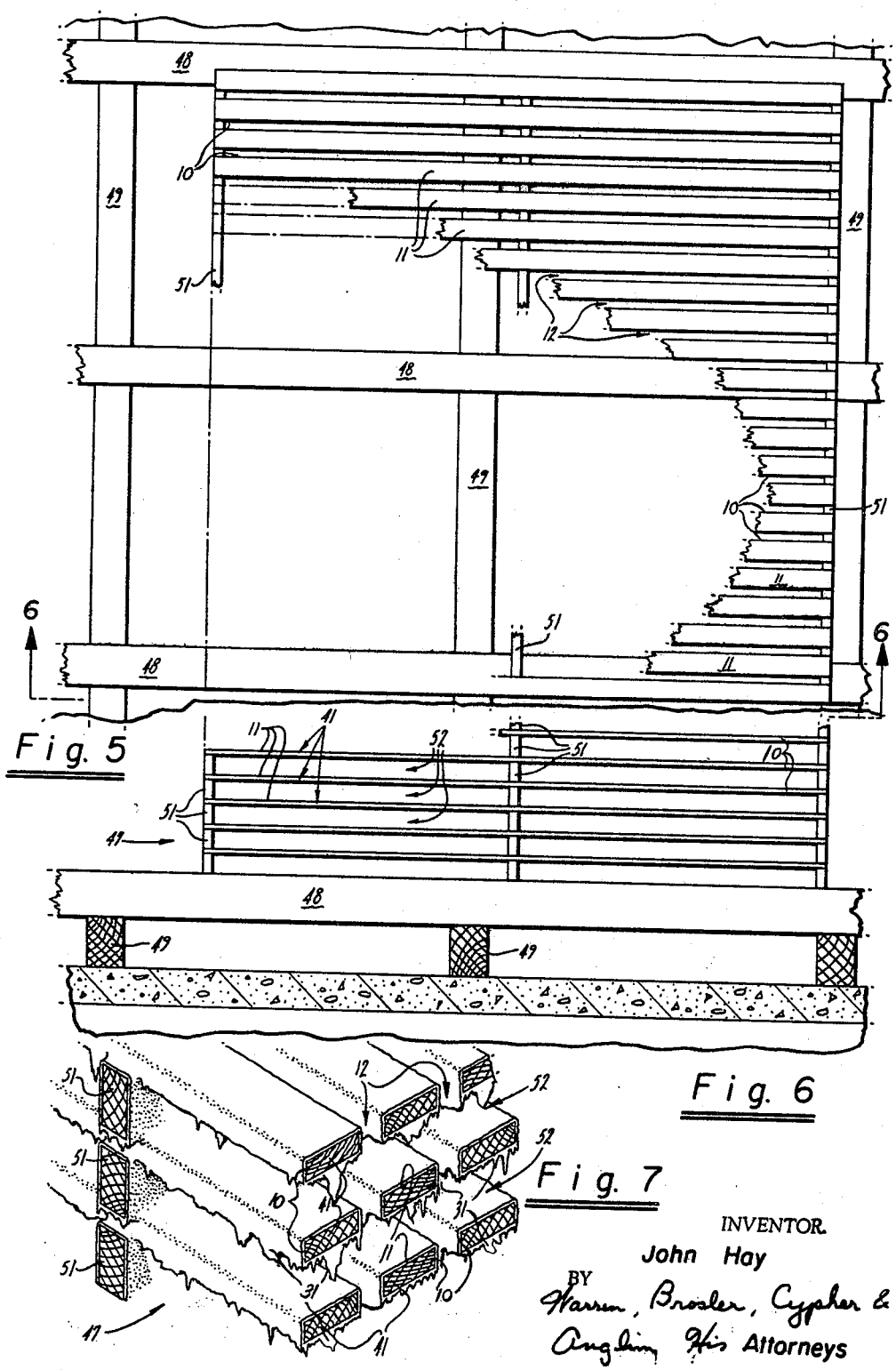

United States Patent Office 3,496,101
Patented Feb. 17, 1970

3,496,101
SEWAGE TREATMENT APPARATUS
AND METHOD
John Hay, deceased, late of Hayward, Calif., by Elaine
Helen Hay, sole heir and legal representative, Fresno,
Calif., assignor to Del-Pak Media Corporation, a corporation of California
Continuation of application Ser. No. 499,099, Oct. 20,
1965. This application Aug. 19, 1968, Ser. No. 756,345
Int. Cl. C02c 1/26
U.S. Cl. 210—17
6 Claims

ABSTRACT OF THE DISCLOSURE

A sewage treatment device constructed as a grid-like array of horizontally and vertically spaced members providing upwardly and downwardly facing, horizontally disposed, roughened surfaces over which liquid sewage will trickle slowly under the influence of gravity and be retained in a contact with biological slimes and exposed to oxygen for a maximum period of time. The members of the array are further formed with relatively short vertically extending sides to minimize the acceleration of the liquid sewage under the action of gravity. Alignment of the members afforts passageways for penetration of light and oxygen as well as the sloughing of flocculence.

---

This is a continuation application based upon my earlier filed pending application Ser. No. 499,099 filed Oct. 20, 1965, and now abandoned.

The invention relates generally to the biological treatment of liquid sewage and waste products. The device of the present invention functions as an aerator, flocculator, and/or a biological filter in primary, secondary, and tertiary treatment.

The treatment of liquid sewage and fluid waste products customarily is divided into three broad categories: primary, secondary, and tertiary or advanced treatment. In the primary phase, raw sewage, or untreated industrial or agricultural liquid waste, containing a substantial amount of solid material with high bio-chemical or chemical oxygen demand, undergoes reduction in floating, settlable, or suspended solids by sedimentation, screening, or by decomposition in septic tanks or sewage digesters.

In secondary treatment, the liquid effluent from the primary treatment process undergoes more thorough treatment by mechanical, biological or chemical means, singly or in combination, to further reduce the quantity of suspended or dissolved solids. In instances where there are no floating or settlable solids, heavily polluted fluid wastes may be introduced directly into this secondary treatment stage eliminating the necessity of circulation through the primary treatment phase.

Tertiary treatment is an advanced and usually final stage of treatment often capable of producing potable water from secondary effluent through aeration, flocculation, coagulation, and filtration followed by the use of a chemical agent such as chlorine.

In primary, secondary and even including tertiary treatment, it has been accepted practice to use standard or high rate filters or aerators to achieve reduction of bio-chemical oxygen demand (B.O.D.) in the waste material. The term "filter" is a misnomer in the sense that it does not function to screen out, by selective sizing, the deleterious dispersants in the waste fluid. A "filter" provides, rather, a habitat or environment for desired biological growth of those micro-organisms capable of feeding upon, breaking down and oxidizing the dissolved, suspended, and/or fluid transported pollutants. Such desired type of biological growth is generally referred to as biological slime, which as used throughout the specification shall mean an accumulation of micro-organisms such as filamentuous fungi, yeasts, bacteria, and protozoans and algae. These organisms are dependents upon the nutrients available in the sewage or fluid waste, and hence, their propagation and growth is an essential function of the filter mechanism and a very important factor in the effectiveness of the sewage treatment system.

The necessary characteristics of a sewage filter, that it should provide for aeration of the sewage through break-up of the fluid stream and biological oxidization of the dissolubles subject to such consumption, are achieved to some degree with previous filters, but they can perform satisfactorily only under certain sewage loading conditions.

For the best performance a sewage filter should maximize the contact time of the liquid sewage with the biological slimes and with circulating air, while still maintaining maximum loading rates (both quantity of sewage and B.O.D. levels) and avoiding clogging. A high retention time of the liquid sewage in the filter allows maximum absorption of oxygen and maximum reduction of the B.O.D. through the biological action of the slimes. In addition longer retention time causes a greater production of flocculence, which can be highly beneficial. Previous filter constructions have not sought to effect such a maximizing of sewage retention time.

One standard sewage filter which is widely employed is the rock-filled filter, in which graded randomly shaped rock is closely packed to form the filter media. Liquid sewage is discharged over the top of the rock and allowed to trickle under the action of gravity to the bottom. The random shape and placement of the rock, however, affords an uncontrolled and unsystematic interstitial spacing of the rock. Thus, only limited control over the drainage rate can be achieved. Drainage in the rock filter is generally accelerated by the sloping or curved shape of the rock, in which there is a relatively low percentage of horizontal surface area and high percentage of inclined or vertically extending surface. Accordingly, the rock filter operates in a manner diametrically opposed to the desirable goal of achieving a high retention time of contact between the sewage medium and the biological slime for maximum biological oxidation.

Numerous other problems are associated with the use of rock filters, including the inherent tendency of a rock filter to clog under normal hydraulic loading, and heavy B.O.D. loadings through plugging of the interstitial spaces with slime. As a result of the interstitial plugging, the filter will pond and if back flushing and chemical treatment does not clear the interstitial areas, the rock filter must be dismantled with the rock filling being removed, cleaned or replaced with fresh rock. The plugging or clogging phenomenon is especially acute when a rock filter is shock loaded, that is, a rapid increase or decrease in the B.O.D. loading occurs. The shock load may kill the slime which falls into and clogs the interstices resulting in ponding.

Rock filled filters also have the following further inherent limitations: they require carefully graded rock sizes to avoid initial plugging of the filter interstices with resultant reduced flow capacity; rock filter media are closely packed in random fashion without reference to the ideal growth characteristics of the biological growth to be propagated; and the random packing of a filter inhibits air circulation throughout the mass, decreasing the effectiveness of the filter as an aerator of the impinging waste fluid. Rock filters also require substantial and expensive foundations to support the considerable superimposed weight, properly placed and costly drain tile positioned at the base of the rock medium for adequate drainage, and structural side walls to contain the mass of the rock. The side walls further prevent lateral circulation of air throughout the filter medium. The rock filter media do not, by their nature, lend themselves to pre-assembly or to change in location or capacity. They generally require substantial service facilities and land to afford means of the anticipated removal and cleaning or replacement of the rock.

Other types of filters have been employed which similarly do not afford maximum retention of the effluent in the filter. One alternative approach has been to disperse the sewage over vertically arranged tubes whereby the effluent trickles axially down the interior of the tubes. Biological slimes form on the surfaces, with the slimes forming on the interior surface growing inwardly to progressively lessen the interior surface area of the tube. Importantly, and as is true with rock-filled filters, retention time of the liquid sewage with the slimes is not maximized, since in the tube-type filter there is almost no horizontal surface area.

Still another type of filter has been employed, that is, the wood media filter. Wood media filters previously in use have characteristically included a plurality of elongated wooden members over which sewage is dispersed. These members, however, have been formed and/or oriented in a manner which results in the flow of liquid sewage over sloped or vertically extending surfaces over substantially all of the vertical height of the filter. These filters provide little or no horizontal surfaces. Thus, whether constructed as a series of slanting or sloping surfaces or vertical surfaces, the sewage is preferentially directed and caused to collect and pass through the filter at a relatively high rate. Since previous wood media filters do not maximize retention time of liquid sewage in the filter, the filter efficiency is less than optimal. Moreover, some wood media filters are constructed so that sloughing biological slimes will clog the filter rather than pass out with the filter effluent as flocculence.

Accordingly, one of the prime objects of the present invention is to provide a biological culture habitat, functioning as a biological filter in a waste fluid treatment system, which maximizes the time during which liquid sewage is retained in contact with biological slimes growing in the habitat.

Yet another object of the present invention is to provide a biological filter for fluid sewage or other waste systems designed to function effectively as an aerator breaking up the waste fluid flow into multiple particles while in intimate communication with an oxygen-containing medium such as air for a maximum period of time.

A further object of the present invention is to provide a biological filter having maximum growth rate of the biological slimes through structuring of the biological environment to produce excess biological growth in flocculent form, and which is further formed to permit free exit of such flocculent from the filter environment without obstructing or clogging the filter.

Again another object of the present invention is to provide a filter apparatus of the above character which is, relatively light weight, reducing support requirements; relatively inexpensive to construct and maintain; formed of materials relatively imprevious to deteriorating action of the sewage being treated and to the consumptive and life processes of the biological medium being utilized; capable of being pre-assembled from divisible and interchangeable units of known capacity, affording maximum flexibility in permitting subsequent modification of capacity or location by the addition or elimination of standard units, each of which is self-supporting and readily installed or removed as a unit by conventional means; and formed to minimize the complexity and cost of the drainage system.

The invention possesses other objects and features of advantage, some of which of the foregoing will be set forth in the following description of the preferred form of the invention which is illustrated in the accompanying drawing and forming part of this specification. It is understood, however, that variations in the showing made by said drawing and description may be adopted within the scope of the invention as set forth in the claims.

Referring to said drawing (three sheets):

FIGURE 1 is a plan view of the sewage treatment apparatus of the present invention;

FIGURE 2 is a side view in cross section of the sewage treatment apparatus taken on line 2—2 of FIGURE 1;

FIGURE 5 is an enlarged fragmentary plan view of one segment of the device as set out by line 5—5 of FIGURE 3;

FIGURE 6 is a side view in cross section of the device taken on line 6—6 of FIGURE 5, and FIGURE 7 is a fragmentary side perspective view of the filter device of the present invention showing biological growth thereon.

Figure 3:
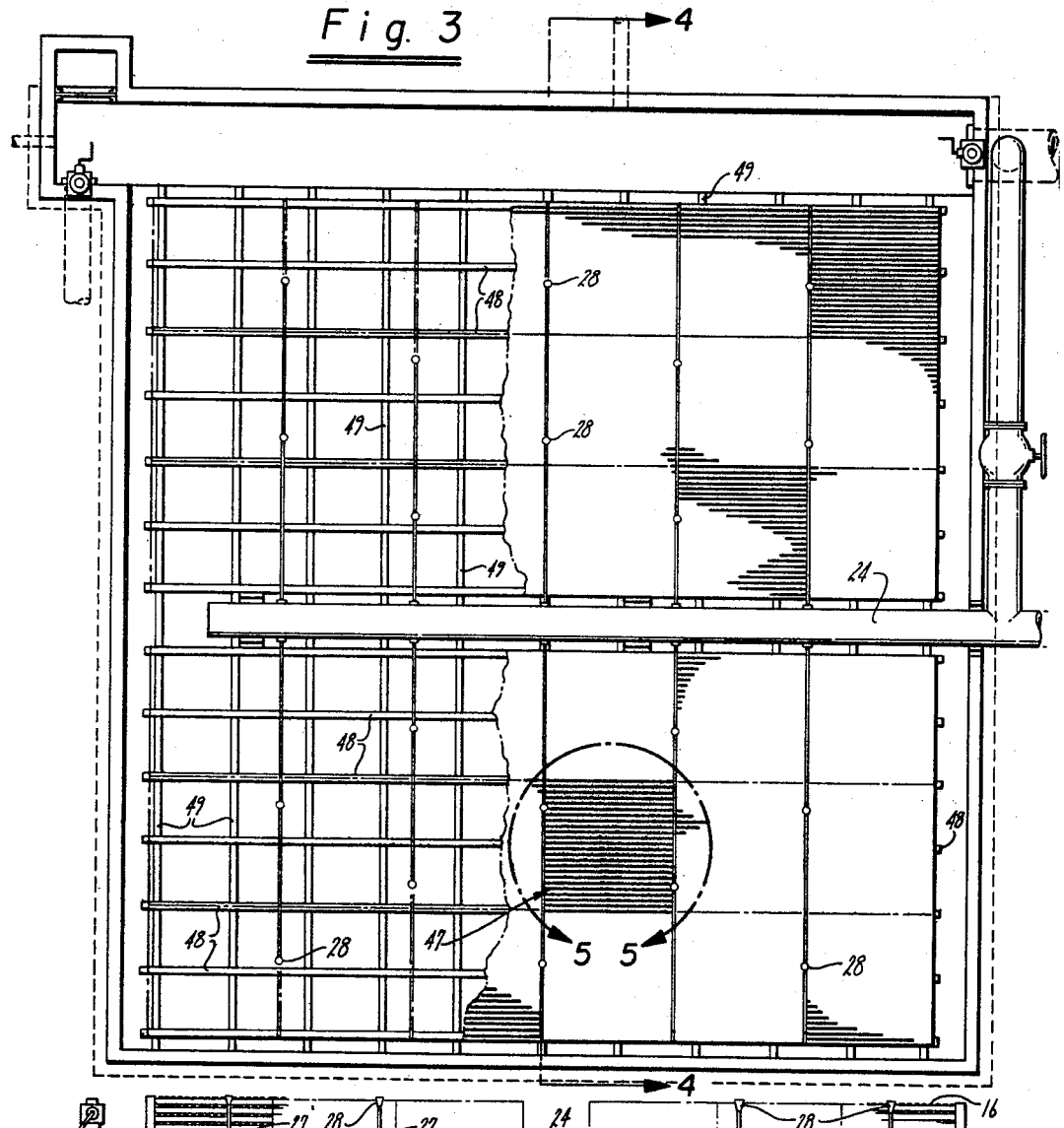
FIGURE 3 is an enlarged plan view of the sewage filter device and the sewage distribution system of the present invention.
Figure 4:
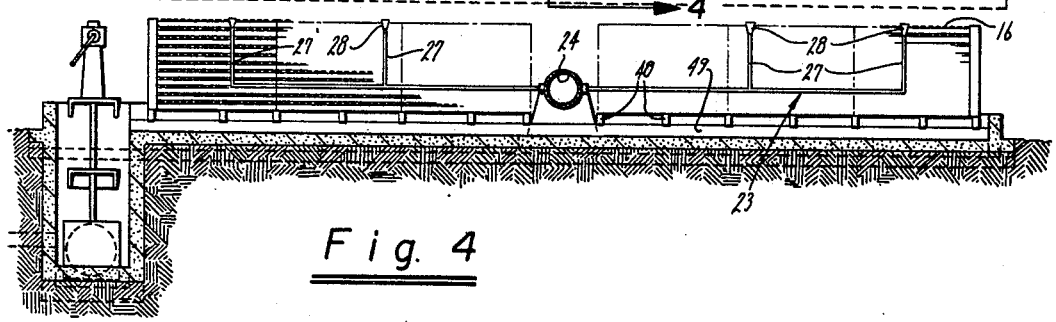
FIGURE 4 is a side view in cross section of the device taken on the line 4—4 of FIGURE 3.

The device of the present invention, which performs the functions of biological filter, flocculator, and aerator and is best shown in FIGURES 5 and 7, comprises generally a lattice-like or grid-like array providing a plurality of generally horizontally extended upwardly and downwardly facing surfaces 11 arranged in stacked, horizontally and vertically spaced relationship defining the interstices 12 therebetween. The structure of the biological filter, flocculator and aerator is designed to be placed in the flow circuit of a sewage or other-type waste fluid under conditions of maximum exposure to the waste flow. The structure is positioned to receive the flow discharge upon the multiple surfaces 11, effectively breaking up the flow into small droplets and a thin-film state. Liquid sewage drops upon the surfaces 11, and upon sufficient buildup of the sewage film upon the upper surfaces, the sewage moves around to the lower surfaces by passing along vertically extending sides 10. Sides 10 have a short vertical dimension in order to communicate the sewage film to the lower horizontal surface without building up sufficient velocity under the action of gravity to cause the film to fall away without coating the lower horizontal surface. Once the film has traveled to the downwardly facing surface, the sewage collects until a drop is formed. Then, the drop falls to the next horizontal upwardly facing surface, and the process is repeated. Thus, maximum effectiveness in aeration of the waste fluid is achieved through mechanical exposure to an available oxygen environment such as that offered by air. The fact that each fluid impact and dispersal surface 11 is surrounded by air space 12 insures maximum interaction of the waste fluid film with the surrounding and freely flowing air. This interaction is increased by reason of the horizontal surfaces, which retain the sewage in a slow moving film maximizing exposure to the oxygen source. As a feature of the invention, each of the surfaces 11 disposed within and comprising the lattice assembly is provided equal access to freely circulating air whereby the surfaces 11 on the lower and middle or center members 41 may contribute equally with those members defining the top most layer and the outer edges of intermediate layers.

Simultaneously while serving as aeration baffles the upwardly and downwardly facing horizontally disposed and oriented surfaces 11 serve importantly to define and provide a biological culture or growth habitat or environment. Once populated with a suitable biological culture, most generally the so-called biological slimes, the array will function as a most effective biological filter wherein the biological medium feeds upon, consumes and oxidizes nutrient-pollutants in the sewage waste. Accordingly, it is highly desirable to achieve maximum propagation of biological growth on each of the multiple horizontal surfaces 11 in order to obtain corresponding biological oxidation of the sewage. It may again be recalled that the provision of maximum exposure to an uninterrupted slow moving waste fluid flow together with availability of air is required, and the same structural arrangement contributing to the effectiveness of the array as an aerator assures that requisite conditions for maximum biological growth.

The means utilized to achieve such a self-regulating yet flocculence-producing biological filter will be best understood with reference to FIGURE 7 wherein the important relationship between the horizontal surfaces 11, comprising the major working portion of the filter, and the adjacent vertical passageways 12 is clearly shown. The plurality of vertically stacked, horizontally aligned, vertically and horizontally spaced surfaces 11 are preferably provided by elongated wooden members 41 mounted on cross-wise vertical spacers 51.

In the present invention, however, while such highly desired biological growth is stimulated and attained, the relationship between the growth characteristics of the biological medium and the vertical spacing 12 between adjacent microenvironmental surfaces 11 is so calculated as to make virtually impossible the production of biological growth extending from one surface 11 to another over and across the intervening space 12. The size of the spaces 12 and the spaces 52 relative to the bridging-capability of the micro-organism and relative to the size and shape of members 41, defining the primary growth surfaces 11, prevents this bridging phenomenon. The structural relationship of the members 41, affixed to the intermediate horizontal supports 51 in a super-imposed, layered grillage, defines the conditions making for maximum growth and propagation of the biological slimes 31 while insuring that each micro-environment 11, comprising the horizontal surface of each member 41, shall, under the most accelerated growth conditions of the slimes, remain separated from its neighbors insuring continued maximum flow of waste fluid throughout all portions of the array.

A still further important function follows from the specific arrangement and relationship of the members defining the array. As the biological slimes grow and increase in area, the surface area of contact between the sewage film and biological growth correspondingly increases. Since the members 41 are freely exposed on all sides both to surrounding air and to the sewage flow, it automatically follows that the total area of the surfaces 11 and the members 41 is increasingly covered with biological growth, and, therefore, the area of contact between the sewage-rich fluid and the underlying biological culture must likewise increase. This effect, coupled with the increased sewage retention time resulting from the filter construction, results in high filter performance. The maximum filter capacity and rate of purification will be attained when the biological slimes 31 have coated each member 41 completely and to the maximum depth consistent with growth and cleavage characteristics of the slimes. Inasmuch as the passageways 12 cannot be bridged by the slimes, once maximum capacity is reached by a state of biological growth, the filter will continue to function at such rate without impairment and without a gradual filling up of interstices and slowing down of flow rate and overall filter capacity.

The apparatus of the present invention can withstand much higher B.O.D. loads than prior devices. When a rock filter is heavily loaded, for example, it will become anerobic in operation producing substantial quantities of gas having an unpleasant odor. The present filter under the same loading will maintain an aerobic operating condition which is much more odor free.

As the biological slimes grow, yet another highly desirable function begins to be operative in the present invention due to the relationship of the structural parts. The slimes 31, in accordance with their growth characteristics, have a cleavage or avalanching tendency in which excess growth is shed in the form of flocculents, a highly desirable by-product of the biologic filter. Flocculent material passing into the filter effluent has a beneficial effect both in the addition of multitudes of micro-organisms which continue to oxidize waste material, but also in the physical operation of agglomeration, clarification and settling out a further quantity of waste material. The free and continuous shedding of such flocculent biological growth is provided for by the surface alignment in vertical rows which maintains the passageways 12 whereby the flocculent material may fall into the effluent flow. Such flocculent material as may fall upon the surfaces 11 is readily transported by a continuous waste fluid flow to the vertical passages 12 so that total flocculence is continuously transported out of the biological filter and into beneficial contact with the sewage effluent. The optimum dimensions to insure maximum biological growth while preventing bridging between adjacent members and for maintaining maximum flocculents transport has been found to be approximately three-quarters of an inch horizontal spacing between members with a vertical spacing of approximately one and one-half inches.

The members 41 themselves are desirably formed of redwood lath having a customary width of approximately one and one-half inches and a thickness of approximately three-eighths of an inch. The thickness is primarily determined by mechanical requirements in order to support the filter. This construction provides upper and lower horizontal surfaces of substantial area relative to the vertical surfaces, and the vertical surfaces only extend over a short distance. Commercial redwood lath is ideally suited to the requirements of a biological filter, being resistant to deterioration by sewage and waste components as well as the life process functions of the biological medium. In addition the redwood lath surfaces provide an ideal environment in that such surfaces are typically somewhat roughened, with wood cells exposed by fabrication, the nature of the material being such as to produce a fibrous, somewhat matted surface offering ideal harborage to the multitude of micro-organisms comprising the biological slimes. It will be clear that other materials may be utilized, including other specie of wood, treated with preservatives if necessary. Artificial materials may be used but in any case the provision of a roughened surface, such as a fibrous, striated, matted, porous or cellular surface, is important as both giving harborage and providing a mechanical key for adhesion of the slimes.

In the present invention sewage or other fluid waste, contaminated with organic or chemical pollutants, is distributed over the upper side 16 of the array by any one of a number of suitable fluid distribution and discharge systems 23. Such distribution system 23 must be adequately sized to the rate of purification of the waste flow which is substantially enhanced in the present invention over the rates of purification obtaining with conventional rock filled filters. A typical flow rate of the present invention is 2.5 gallons per minute per square foot of area of the upper side 16 of the filter or 370 pounds of B.O.D. per day per 1000 cubic feet of media; a maximum flow rate of .48 gallon per minute per square foot of surface area or 47 pounds of B.O.D. per day per 1000 cubic feet of media would, by comparison, be representative of the much lower purification capacity of the rock-filled filter. Waste distribution system 23 is comprised of a fluid delivery conduit 24 communicating with a liquid sewage source at spiro-vortex 25 (other sources can be used), and leading to a plurality of delivery pipes 27 and discharge heads 28 which disperse the flow and deposit it in the form of distributed drops or spray over the upper side 16 of the array. The placement of discharge nozzles 28 should be selected to provide an optimum uniform distribution of liquid waste over the entire upper surface of the array with sufficient pressure to produce impact dispersion and adequate flow over the super-imposed surfaces 11.

The distribution of the liquid waste over the top side of the filter structure may be achieved in various ways differing from the affixed stand pipes and discharge heads shown. For example, rotary sweep arm type distributing systems in which laterally extended arms provided with a plurality of discharge jets which are slowly rotated over the top of the filter area may be satisfactorily employed. This type of system is not required when the filter structure of the present invention is utilized, and, therefore, equipment and maintenance economies within the total waste treatment system can be achieved.

As shown, the biological filter array of the present invention may be assembled on a sewage effluent draining bed 46 and preferably, a wall 47 surrounds the drain bed 46, which wall is kept sufficiently low to permit free passage of air through the positioned filter while serving as an adequate screen to restrain windblown or splashed effluent. As shown in FIGURE 6, the array 47 constituting the filter proper may be placed upon cross sleepers 48 and 49 spacing it from the sewage drainage bed 46 and affording free drainage of the effluent from the filter.

I claim:
1. A liquid wastes treatment device comprising:
a grid-like array including a plurality of horizontally spaced and vertically aligned rows of vertically spaced elongate members and means formed to secure said members in fixed spaced relation, each of said members being formed with a transverse cross-section-section defined by a pair of substantially horizontally disposed and oriented roughened surfaces of substantial area and connecting vertically extending surfaces of insubstantial vertical dimension, said means being further formed and positioned so that the major portion of the downward flow of liquid wastes in said array occurs by the free fall of droplets of liquid wastes from one member to a vertically adjacent member, said vertically spaced members being positioned with the immediately vertically adjacent members in vertical alignment to form said vertically aligned rows, said rows defining passageways extending vertically and substantially perpendicularly to said horizontal surfaces, and
said array being further formed for mounting to intercept the flow of liquid wastes over the uppermost surfaces thereof and being formed for mounting with one side of said array with which said passageways communicate exposed to light and oxygen.

2. The device as set forth in claim 1 wherein, said members are formed from redwood lath and of rectangular cross section with a longer pair of sides horizontally disposed.

3. The device as set forth in claim 1 wherein said members are mounted in horizontally spaced relation with the distance between adjacent sides being between about ¾ inch and in vertically spaced relation with the distance between adjacent surfaces being about 1½ inches.

4. A liquid wastes treatment device as defined in claim 1 wherein:
said means for supporting said elongate members is comprised of at least two transversely and vertically extending support members positioned at remote ends of said elongate members, said horizontally spaced longate members forming a layer which is secured to said support members, said support members being formed to position said layer of elongate members in vertical alignment with a second layer of elongate members and affording the sole vertical interconnecting surface between said layers, said support members and first layer of elongate members constituting a self-supporting modular element suitable for use in formation of said array by stacking a plurality of said elements in vertical alignment.

5. The method of treating liquid wastes comprising:
selecting a liquid wastes treatment device having a grid-like array including a plurality of horizontally spaced and vertically aligned rows of vertically spaced elongate members and means formed to secure said members in fixed spaced relation, each of said members being formed with a transverse cross section defined by a pair of substantially horizontally disposed and oriented roughened surfaces of substantial area and connecting vertically extending surfaces of insubstantial vertical dimension, said means being further formed and positioned so that the major portion of the downward flow of liquid wastes in said array occurs by the free fall of droplets of liquid wastes from one member to a vertically adjacent member, said vertically spaced members being positioned with the immediately vertically adjacent members in vertical alignment to form said vertically aligned rows,
exposing said device to a source of oxygen and light, and
delivering liquid sewage over the uppermost portion of said device for gravitation over said members.

6. The method of treating sewage as defined in claim 5 wherein said members are formed of redwood and mounted in horizontally spaced relation with the distance between adjacent sides being about ¾ inch and in vertically spaced relation with the distance between adjacent surfaces being about 1½ inches.

References Cited
UNITED STATES PATENTS

| | | | |
|---|---|---|---|
| 3,112,261 | 11/1963 | Porter et al. | 210—17 |
| 3,143,498 | 8/1964 | Fordyce et al. | 210—151 X |
| 3,219,577 | 11/1965 | Powers | 210—17 |
| 3,231,490 | 1/1966 | Fry | 210—17 |

MICHAEL E. ROGERS, Primary Examiner

U.S. Cl. X.R.
210—150; 261—112